April 5, 1927.
F. T. O'GRADY
1,623,435
MOTION PICTURE PROJECTOR
Filed May 18, 1923   3 Sheets-Sheet 1
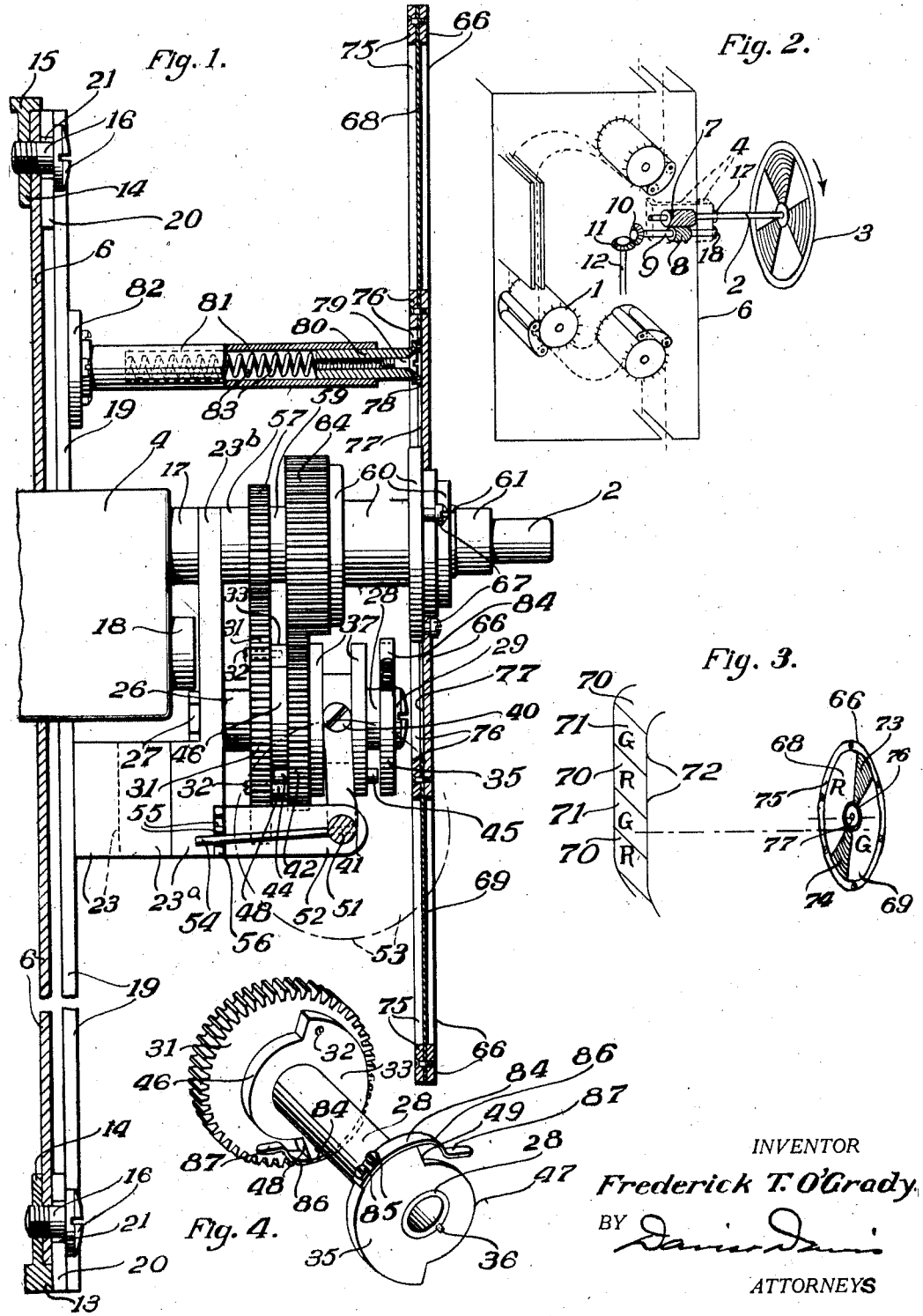
INVENTOR
Frederick T. O'Grady,
BY
ATTORNEYS April 5, 1927.

F. T. O'GRADY 1,623,435

MOTION PICTURE PROJECTOR

Filed May 18, 1923   3 Sheets-Sheet 2

INVENTOR
Frederick T. O'Grady.
BY
ATTORNEYS.

April 5, 1927. 1,623,435
F. T. O'GRADY
MOTION PICTURE PROJECTOR
Filed May 18, 1923   3 Sheets-Sheet 3
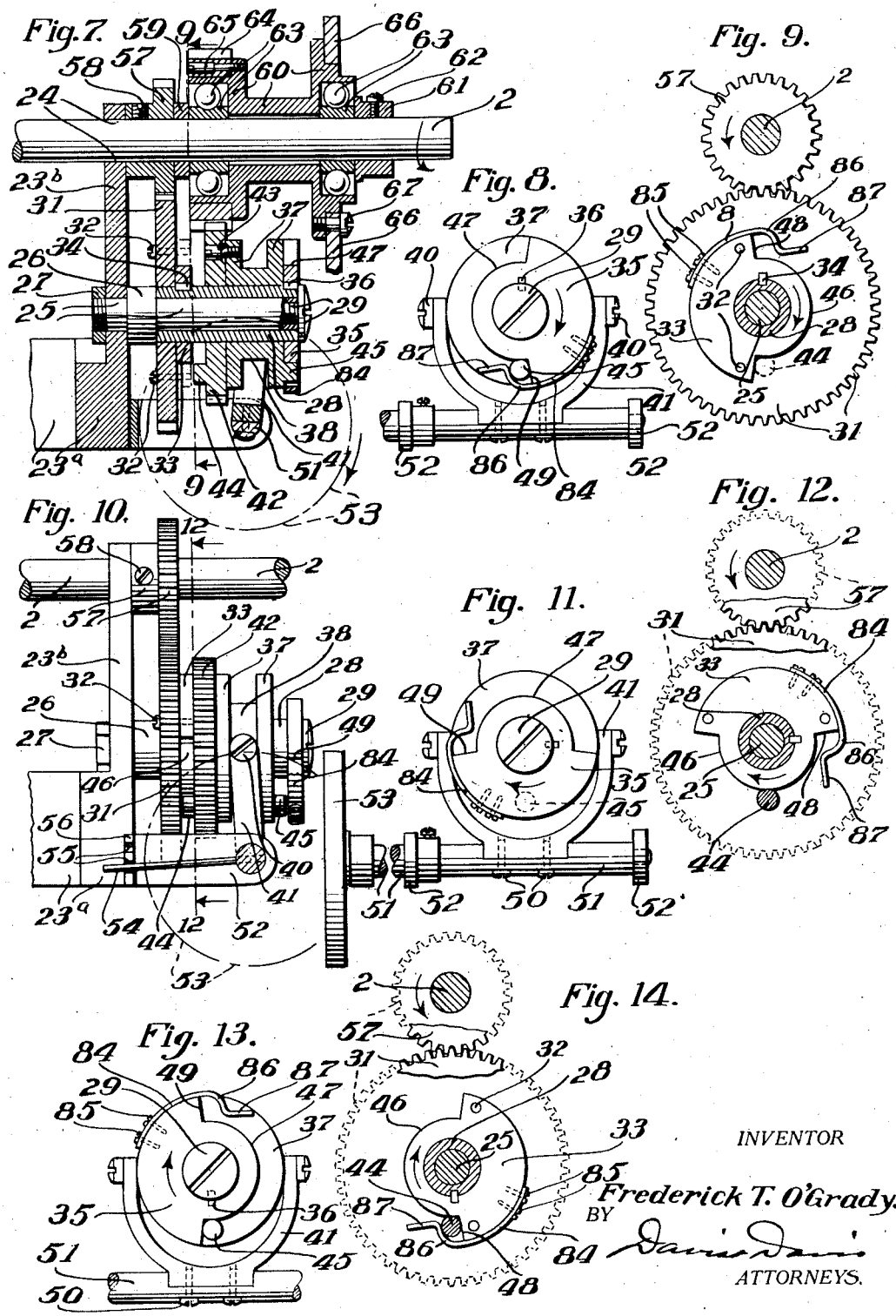
INVENTOR
Frederick T. O'Grady.
BY
ATTORNEYS.

Patented Apr. 5, 1927.

1,623,435

UNITED STATES PATENT OFFICE.

FREDERICK T. O'GRADY, OF FLUSHING, NEW YORK, ASSIGNOR TO HELEN VOGT O'GRADY, OF FLUSHING, NEW YORK.

MOTION-PICTURE PROJECTOR.

Application filed May 18, 1923. Serial No. 639,844.

This invention relates to improvements in motion picture projectors, and more particularly to projectors for exhibiting pictures in natural colors by the use of films having alternating images of two different color values.

In projecting pictures from films of this type it is essential that the movement of the two differently colored screens or filters be so timed with the film feed that as each image is brought into position for exhibition a screen of corresponding color value will also be brought into position across the path of the projection light flux, and that as each image is advanced a shutter blade or blade section shall be brought into position across the light flux to conceal the change from image to image.

The invention has for its principal objects to provide means for readily adapting standard motion picture projectors, designed for projecting black and white images, for use in projecting colored pictures with films of the type above described, and to provide means for quickly bringing the revolving color filters in properly timed relation with the film when, owing to improper threading of the film, it is found that a filter of one color value is brought across the light flux when an image of a different color value is brought into position for exhibition. A further object of the invention is to provide simple means for synchronizing the movement of the color filters with the movement of the film while the machine is in operation. Another object of the invention is to provide simple means for driving a combined shutter and filter carrier at the rate of one revolution for each two feed movements and rest periods of the film.

Figure 5:
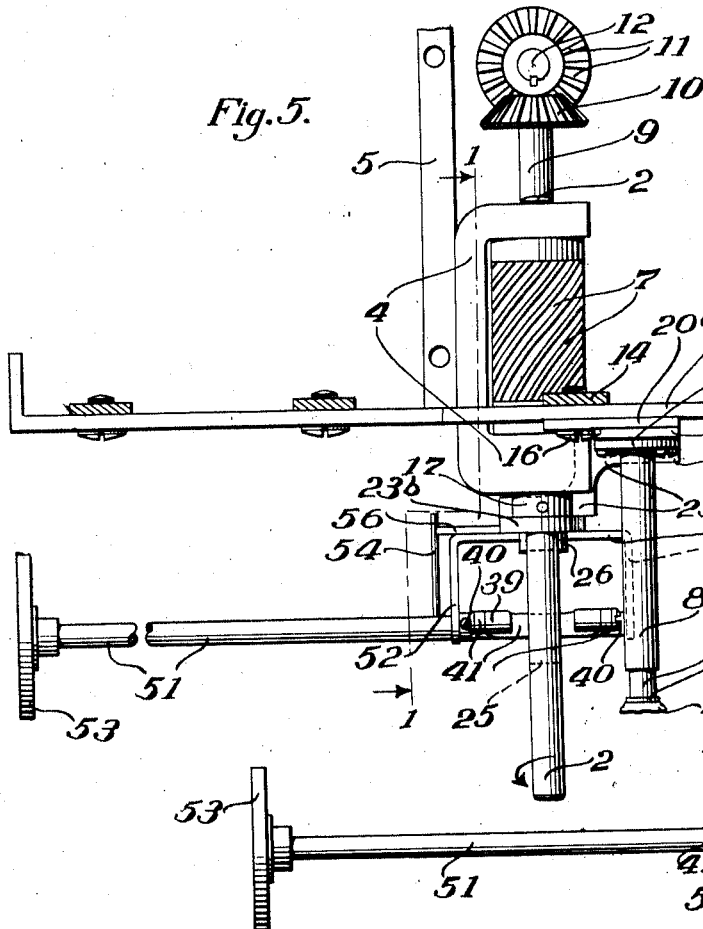
Figure 6:
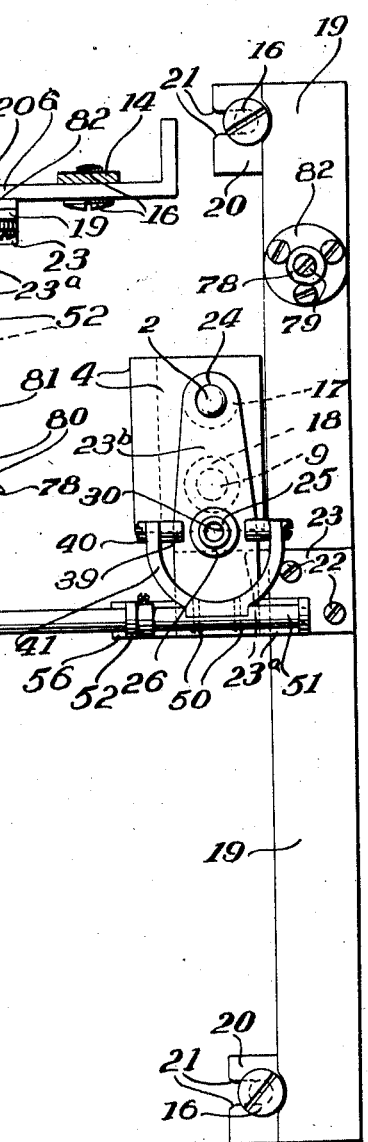

In the drawings, Figure 1 is a sectional view taken on the line 1—1 of Fig. 5, showing the attachment applied to a well-known form of projection machine for projecting black and white motion pictures;

Fig. 2 a diagrammatic view of the black-and-white-image projecting machine;

Fig. 3 a detail view showing the color motion picture film and the combined shutter and filter carrier for use therewith;

Fig. 4 a perspective view of part of the improved driving means for the shutter and filter carrier;

Fig. 5 a detail plan view showing the attachment applied to an ordinary black-and-white-image projecting machine, the speed reduction gearing and part of the set-back mechanism for controlling the proper registration of the filters with the film images being omitted;

Fig. 6 a front elevation of the parts shown in Fig. 5;

Fig. 7 a detail sectional view of the shutter and filter carrier driving and set-back mechanism;

Fig. 8 an end view of the set-back mechanism, the parts being in the same position as shown in Fig. 7;

Fig. 9 a section on the line 9—9 of Fig. 7;

Figs. 10, 11 and 12 are views similar to Figs. 7, 8 and 9, showing the operation of the parts whereby the shutter and filter carrier loses one-half a revolution with respect to the shutter shaft when the hand-operated shifter yoke is moved from the position shown in Fig. 7 to that shown in Fig. 1; and Figs. 13 and 14 are views similar to Figs. 8 and 9, the parts being in the positions shown in Fig. 1.

The embodiment of the invention illustrated may be considerably varied without departing from the invention. The device shown is especially adapted for use as an attachment for a motion picture projector, designed for exhibiting images in black and white, to adapt the same for use with panchromatic motion picture films and color filter carriers of the type described in Patent No. 941,960 granted November 30, 1909 to G. A. Smith. It will be evident, however, that the device may be adapted for use in connection with other styles of projecting machines to adapt the same for projecting pictures in natural colors.

In the projector shown, and in all, or practically all, other projectors now in use for projecting images in black and white, the intermittent film speed mechanism sprocket 1 and the shutter shaft 2 on which the shutter 3 is fixed are connected by suitable gear trains to a single source of power, the gear trains being designed so that the shutter shaft will make one revolution during the period the intermittent feed mechanism moves the film to advance one image to exhibition position and holds said image in such position. To adapt such machines for use with the panchromatic film and color filter carrier of the Smith patent it is obvious that provision must be made whereby two images on the film may be successively brought and held in exhibition position during each revolution of the filter carrier. An important feature of the invention consists in the provision of simple means whereby the two color filters and the two shutter blades may be mounted on the shutter shaft and rotated at one-half the speed of rotation of said shaft to effect the proper timing of the filters and blades with the film feed.

In the machine shown in the drawings the shutter 3 is detachably held on the outer end of the shutter shaft 2 which is journaled in a shutter gear bracket 4 held to the central wall or standard 5 of the projector frame and projecting through an aperture in the front cover plate 6 of the projector. A shutter shaft gear 7 fixed on shutter shaft 2 meshes with a shutter drive gear 8 fixed on a drive shaft 9 journaled in bracket 4. A gear 10 on the inner end of shaft 5 meshes with a gear 11 on a vertical shaft 12 which is driven from the same source of power (not shown) that drives the usual intermittent feed mechanism (not shown) which operates the film feed sprocket 1. Cover plate 6 is held to ears 14 on a base 13 and a top plate 15 by screws 16. Collars 17 and 18 are fixed on shafts 2 and 9, respectively, at the outer end of bracket 4.

To adapt the machine for color picture projection the shutter 3 is removed from shaft 2 and the attachment hereinafter described is applied to the machine. The attachment comprises a bar-like metal standard 19 having rigid laterally extending ears 20 at its upper and lower ends provided with horizontally extending slots 21 adapted to receive the shanks of two of the cover plate fastening screws 16 to hold the bar upright at one edge of the shutter gear bracket 4. A rigid metal bracket 23 is secured by screws 22 to bar 19 substantially midway the ends of the bar, said bracket having an angular horizontal arm 23ª extending outwardly and then laterally so that its outer end underlies shutter shaft 2 in a vertical plane forward of the outer end of gear bracket 4 when the bar is clamped to the projector casing. Bracket 23 is formed with a flat upright arm 23ᵇ which extends upwardly from the outer end of arm 23ª in a vertical plane extending transversely of shaft 2 and preferably just forward of the outer ends of the collars 17 and 18 on shafts 2 and 9. An aperture 24 adjacent the upper end of arm 23ᵇ receives the shutter shaft 2.

A horizontal stub shaft or bearing rod 25 is rigidly and non-rotatably held at its inner end to bracket arm 23ᵇ below aperture 24, said shaft having a shoulder 26 abutting against the outer face of said bracket arm and having its inner end passed through an aperture in the arm; a clamping nut 27 being screwed on the threaded inner end of the shaft against the inner face of the bracket arm. Shaft 25 is parallel with shutter shaft 2 when the attachment is in place and its outer end is located substantially nearer arm 23ᵇ than the outer end of the shaft 2 so as not to interfere with the filter carrier and shutter hereinafter described.

A sleeve or tubular countershaft 28 is revoluble about shaft or rod 25 and extends from shoulder 26 to the outer end of the shaft, said sleeve being detachably held on the shaft 25 by a screw 29 screwed into a threaded socket 30 in the outer end of the shaft 25. A gear wheel 31 mounted on the inner end of sleeve 28 is held by screws 32 against the inner face of a mutilated clutch disk 33 rigidly locked on the sleeve by a key 34. A second mutilated clutch disk 35 is rigidly locked on sleeve 28 at the outer end of the sleeve by a key 36. A disk-like shiftable clutch member 37 is loosely mounted on sleeve 28 between disks 33 and 35 so as to permit relative rotary and endwise movements between said sleeve and shiftable member. The shiftable clutch member 37 is formed with a circumferential channel or groove 38 in which engage the rollers 39 journaled on pivot screws 40 carried by the upper ends of the arms of the shifter yoke 41. A gear wheel 42 loose on sleeve 28 is held by countersunk screws 43 to the inner face of clutch member 37 so said gear wheel and member will revolve and shift endwise as a unit.

A single rigid clutch pin or stud 44 projects inwardly from gear wheel 42 and a single rigid clutch pin or stud 45 projects outwardly from the outer face of member 37 directly opposite or in longitudinal alinement with stud 44. Disks 33 and 35 are cut away around their peripheries slightly more than 180 degrees to provide recesses 46 and 47 adapted to receive studs 44 and 45 respectively and permit relative rotation to the extent of one-half a revolution between the tubular countershaft or sleeve 28, gear 31 and disks 33 and 35 on the one hand, and gear 42 and member 37 on the other hand, each time yoke 41 is rocked in either direction, as more fully hereinafter described. The end wall 48 of recess 46 forms a driving abutment or clutch projection adapted to engage and drive stud 44 when member 37 is shifted inwardly, and end wall 49 of recess 47 forms a driving abutment or clutch projection adapted to engage and drive stud 45 when member 37 is shifted outwardly, said member having sufficient endwise movement to withdraw one stud out of the path of its driving abutment when the other stud is shifted into the path of its driving abutment.

The yoke 41 is rigidly held by screws 50 to a rock shaft 51 journaled in a bracket 52 rigidly held to arm 23ª of bracket 23, said shaft extending horizontally to a point adjacent one side of the projector casing and being provided with a knob or hand wheel 53 by means of which the shaft may be oscillated or rocked to swing yoke 41 in and out. A relatively stiff spring wire detent pin 54 having one end driven through a hole in shaft 51 is adapted to snap alternately in two vertically spaced notches 55 in an ear 56 on bracket 52 to prevent accidental shifting of the endwise movable clutch member 37. The parts on sleeve 28 are preferably so arranged that one stud will be moved partly across the path of its driving abutment before the other stud is entirely withdrawn from in front of its driving abutment when the yoke is shifted.

The parts of the attachment heretofore described are adapted to be handled and attached to the projector as a unit when the usual shutter 3 is removed. I then slip a gear wheel 57 upon the shutter shaft 2 and lock the same to the shaft by a set screw 58 with the teeth of said gear wheel in mesh with the teeth of gear wheel 31. A washer 59 is then slipped on shaft 2 against gear 57 and then the hub 60 of the disk-like combined shutter and color filter carrier is slipped on the shaft and is held against endwise movement by washer 59 and a collar 61 which is locked on the outer end of the shaft by a set screw 62. The ends of hub 60, which is loose on shaft 2, are preferably recessed to receive suitable antifriction bearing devices 63, and a wide ring gear 64 is held on the inner end of said hub by screws 65, the teeth of said gear remaining in mesh with the teeth of gear 42 in all shifted positions of member 37. The combined shutter and filter carrier is of somewhat the same form as that shown in Fig. 2 of the Smith patent above referred to, and comprises a metal disk 66 held to hub 60 by screws 67 and provided with two diametrically oppositely disposed arcuate apertures through which the light flux from the projector is adapted to pass alternately as the disk revolves, one of said apertures being covered with a sheet 68 of red light filtering material and the other being covered with a sheet 69 of green light filtering material adapted to cooperate respectively with the alternate images 70 and 71 of red and green color value on the film 72. The color filters are held to the disk by two concentric retaining rings 75 and 76. The radial webs between the ends of the apertures in disk 66 form two light-cut-off shutter blades 73 and 74 diametrically opposite each other, which alternately cut off the projection light flux to conceal the picture changes or film feed movements, the blade 73 concealing the changes from green to red images and blade 74 concealing the changes from red to green images, the shutter and shutter shaft rotating in a counter-clockwise direction when viewed from the front of the projector. In order to effect proper cooperation of the filter carrier and film, gear 31 is made twice the size of gear 57, i. e. the gear ratio is 1 to 2, while gears 42 and 64 have the same number of teeth or a ratio of 1 to 1. It will be thus obvious that the combined shutter and filter carrier 66 will be revolved around shaft 2 at one-half the rate of rotation of said shaft so that the usual intermittent film feed device will move and hold two successive images in the path of the projection light flux during each revolution of the combined shutter and filter carrier.

I provide a continuous flat braking surface 77 on the inner face of the rotatable disk 66 between ring 76 and the periphery of the disk hub 60, which surface is constantly engaged by a pad 78 of suitable friction material held by a screw 79 to the outer end of a brake plunger or detent device 80. Plunger 80 is guided in a tubular casing or barrel 81 having a base 82 secured to the upright bar 19 by suitable screws, as shown, the plunger being yieldably pressed against the brake face 77 by a coil spring 83 confined in the barrel 81. Spring 83 is relatively light as it need not press the brake plunger very firmly against the disk as a light pressure is sufficient in addition to friction and inertia in the parts to cause disk 66 to slow down substantially or stop very quickly when the driving connection is broken.

When the parts are in the positions shown in Figs. 7 to 9, it will be obvious that disk 66 will be driven at one-half the speed of rotation of shaft 2 and in the same counter-clockwise direction, as above set forth, by reason of the engagement of abutment 49 with clutch pin 45. If handle 53 is then turned part of a revolution to the left to swing detent pin from the upper one of notches 55 to the lower notch as shown in Figs. 1 and 10, it will be obvious that pin 45 will be withdrawn from in front of abutment 49 and pin 44 will be simultaneously carried into recess 46 in disk 33 at the opposite end of said recess from abutment 48 on said disk 33. The driving connection between shaft 2 and shutter disk 66 is thus interrupted, whereupon said disk 66 with gears 64 and 42 and clutch member 37 will instantly slow down rapidly or stop while sleeve 28 with gear 31 and clutch disks 33 and 35 will continue to be driven by gear 57 and shaft 2, as shown in Figs. 10 to 12, until abutment 48 engages pin 44 as shown in Figs. 1 and 14 and thus restores the driving connection between shaft 2 and shutter disk 66. By turning handle 53 back toward the right to shift gear 42 and member 37 again outward to the position shown in Fig. 7, pin 44 is withdrawn from abutment 48 and pin 45 is carried into recess 47 at the opposite end of said recess from abutment 49 whereupon the driving connection is again broken until abutment 49 engages pin 45.

It therefore will be evident that for each movement of member 37 either in or out the shutter will lose one-half a revolution. It is apparent that simple means is thus provided for resetting the combined shutter and filter carrier almost instantly while the machine is in operation when it is found that owing to improper threading of the film in the machine an image of one color value is positioned opposite the aperture plate when a color filter of another color value is in register with the aperture plate. Stoppage of the machine and rethreading of the film is thus avoided. It is simply necessary to turn the handle 53 to carry detent 54 from whichever notch 55 it is engaged with into the other one of said notches. It is also evident that simple means is provided whereby the color filter carrier may be mounted on and driven, at the proper speed with relation to the film feed, from the shutter shaft of a projector designed for exhibiting images in black and white.

The brake 78—80 prevents the filter carrier and shutter disk 66 from running ahead of the driving means. To supplement the action of the brake suitable spring detents may be provided on disks 33 and 35 for engaging pins 44 and 45 and holding them against abutments 48 and 49. I have shown a suitable form of such detents comprising light, resilient metal straps or spring tongues 84 each held at one end to the periphery of one of the disks 33, 35, by screws 85 and having an inwardly turned pin-engaging hook portion 86 terminating in an outwardly extending cam portion or nose 87 tangential to the inner arcuate edges of the recesses 46, 47 cut in the disks. The springs are quite light and owing to the cam noses 87 pass very easily over the pins during shutter set-back operations. The hooks 86, however, are so disposed with relation to the rear ends of the springs and the disks and pins that they strongly resist any tendency of a pin to run ahead of its driving abutment.

What I claim is:

1. In a motion picture projector, the combination of a rotatable color filter carrier rotatably mounted on and driven from the shutter shaft of the projector and having two diametrically opposed light filters of different color thereon, and means for synchronizing said filters with a film having alternate images of two different color values corresponding with the color values of the filters while the projector is in operation.

2. The combination with a motion picture projector having an intermittent film feed device and a shutter shaft driven at the rate of one revolution for each feed operation of the intermittent film feed device, of a shutter mounted on the shutter shaft having two diametrically opposed blades, and means for driving said shutter from the shutter shaft at one-half the speed of rotation of the shaft.

3. The combination with a motion picture projector having an intermittent film feed device, a shutter shaft, and means for rotating the shaft and actuating the film feed device to effect one picture change for each revolution of the shaft, of a color filter carrier mounted on the shutter shaft having two diametrically opposed light filters of different color value, and means for driving said carrier from the shutter shaft at one-half the speed of rotation of the shaft.

4. The combination with a motion picture projector having an intermittent film feed device and a shutter shaft driven at the rate of one revolution for each feed operation of the intermittent film feed device, of a shutter mounted on the shutter shaft having two diametrically opposed blades, means for driving said shutter from the shutter shaft at one-half the speed of rotation of the shaft, and manually operable means for causing the shutter to lose one-half a revolution while the projector is in operation.

5. The combination with a motion picture projector having an intermittent film feed device, a shutter shaft, and means for rotating the shaft and actuating the film feed device to effect one picture change for each revolution of the shaft, of a color filter carrier mounted on the shutter shaft having two diametrically opposed light filters of different color value, means for driving said carrier from the shutter shaft at one-half the speed of rotation of the shaft, and manually operable means for causing the filter carrier to lose one-half a revolution at will while the projector is in operation.

6. In a motion picture projector having a shutter shaft and means for rotating the same one revolution for each film feed movement, the combination of a rotary carrier mounted on the shutter shaft provided with two diametrically opposed light cut-off shutter blades and two diametrically opposed light filters of different color values located between said blades, and means for driving said carrier from the shutter shaft at one-half the speed of rotation of the shaft.

7. In a motion picture projector having a shutter shaft and means for rotating the same one revolution for each film feed movement, the combination of a rotary carrier mounted on the shutter shaft provided with two diametrically opposed light cut-off shutter blades and two diametrically opposed light filters of different color values located between said blades, of means for driving said carrier from the shutter shaft at one-half the speed of rotation of the shaft, and means for causing said carrier at will to lose one-half a revolution while the projector is in operation.

8. In a motion picture projector, the combination of a shutter drive shaft, a multiple blade shutter loose on said shaft, and a speed-reduction gearing forming a driving connection between said shaft and shutter for rotating the shutter, the speed ratio being such that the shutter shaft will turn one revolution for each blade of the shutter during a single revolution of the shutter.

9. In a motion picture projector having an intermittent film feed device, the combination of a rotatable light filter carrier, a plurality of differently colored light filters spaced around said carrier, means for driving said carrier in synchronism with the film feed device at a rate to present one filter across the path of the projection light flux during each period of rest of a film feed by said device, and manually operable means for causing the carrier driving means to cease rotating the carrier and automatically resume rotation thereof when the film feed device has gained one feed movement with respect to the light filters, for the purpose set forth.

10. In a motion picture projector having an intermittent film feed device, the combination of a rotatable light filter carrier, a plurality of differently colored light filters spaced around said carrier, means for driving said carrier in synchronism with the film feed device at a rate to present one filter across the path of the projection light flux during each period of rest of a film feed by said device, manually operable means for causing the carrier driving means to cease rotating the carrier and automatically resume rotation thereof when the film feed device has gained one feed movement with respect to the light filters, and a plurality of light cut-off shutter blades on the filter carrier between the light filters.

11. In a motion picture projector having an intermittent film feed device and a shutter shaft driven at a rate of one revolution for each feed movement of said device, the combination of a filter carrier loose on the shaft, a plurality of differently colored light filters equally spaced around the carrier, and a speed-reduction gearing forming a driving connection between said shaft and carrier for rotating the carrier once during the time required by the shutter shaft to rotate a number of revolutions equal to the number of light filters.

12. In a color motion picture projector, the combination of an intermittent film feed device, a rotatable filter carrier, a pair of diametrically opposed light filters of different color values mounted on said carrier to rotate therewith, driving means for rotating the carrier one revolution for each two feed movements of said device, and manually operable means for causing said driving means to release the carrier and automatically resume driving the carrier after the carrier has lost one-half a revolution.

13. In a motion picture projector, the combination of a shutter drive shaft, a countershaft, a gear fixed on the shutter shaft, a gear fixed on the countershaft and meshing with the gear on the shutter shaft and having twice as many teeth, a filter carrier loose on the shutter shaft, two diametrically opposed light filters of different color values on said carrier, a gear fixed on said carrier, an endwise shiftable driven clutch member loose on the countershaft, a gear fixed on said shiftable clutch member and meshing with the gear on the carrier and having the same number of teeth as this latter gear, a pair of oppositely extending longitudinally alined projections movable with the shiftable clutch member, a pair of driving clutch members fixed on the countershaft at opposite ends of the shiftable clutch member each having a driving abutment adapted to engage one of the projections on the shiftable clutch member, and manually operable means for shifting the shiftable clutch member endwise alternately in opposite directions to withdraw one projection from engagement with its driving abutment and present the other projection in the path of its driving abutment, said two abutments being spaced around the countershaft to permit the driving clutch members to rotate one-half a revolution relatively to the driven member before picking up the driven member when the driven member is shifted endwise in either direction.

14. In a motion picture projector, the combination of a shutter drive shaft, a countershaft, a gear fixed on the shutter shaft, a gear fixed on the countershaft and meshing with the gear on the shutter shaft and having twice as many teeth, a filter carrier loose on the shutter shaft, two diametrically opposed light filters of different color values on said carrier, a gear fixed on said carrier, an endwise shiftable driven clutch member loose on the countershaft, a gear fixed on said shiftable clutch member and meshing with the gear on the carrier and having the same number of teeth as this latter gear, a pair of oppositely extending longitudinally alined projections movable with the shiftable clutch member, a pair of driving clutch members fixed on the countershaft at opposite ends of the shiftable clutch member each having a driving abutment adapted to engage one of the projections on the shiftable clutch member, manually operable means for shifting the shiftable clutch member endwise alternately in opposite directions to withdraw one projection from engagement with its driving abutment and present the other projection in the path of its driving abutment, said two abutments being spaced around the countershaft to permit the driving clutch members to rotate one-half a revolution relatively to the driven member before picking up the driven member when the driven member is shifted endwise in either direction, and means for retarding rotation of the filter carrier.

15. In a motion picture projector, the combination of a shutter drive shaft, a counter shaft, a gear fixed on the shutter shaft, a gear fixed on the countershaft and meshing with the gear on the shutter shaft and having twice as many teeth, a filter carrier loose on the shutter shaft, two diametrically opposed light filters of different color values on said carrier, a gear fixed on said carrier, an endwise shiftable driven clutch member loose on the countershaft, a gear fixed on said shiftable clutch member and meshing with the gear on the carrier and having the same number of teeth as this latter gear, a pair of oppositely extending longitudinally alined projections movable with the shiftable clutch member, a pair of driving clutch members fixed on the countershaft at opposite ends of the shiftable clutch member each having a driving abutment adapted to engage one of the projections on the shiftable clutch member, manually operable means for shifting the shiftable clutch member endwise alternately in opposite directions to withdraw one projection from engagement with its driving abutment and present the other projection in the path of its driving abutment, said two abutments being spaced around the countershaft to permit the driving clutch members to rotate one-half a revolution relatively to the driven member before picking up the driven member when the driven member is shifted endwise in either direction, and a friction brake for arresting the carrier when its driving connection is interrupted temporarily by the shifting of the endwise movable clutch member.

16. In a motion picture projector, the combination of a shutter drive shaft, a countershaft, a gear fixed on the shutter shaft, a gear fixed on the countershaft and meshing with the gear on the shutter shaft and having twice as many teeth, a filter carrier loose on the shutter shaft, two diametrically opposed light filters of different color values on said carrier, a gear fixed on said carrier, an endwise shiftable driven clutch member loose on the countershaft, a gear fixed on said shiftable clutch member and meshing with the gear on the carrier and having the same number of teeth as this latter gear, a pair of oppositely extending longitudinally alined projections movable with the shiftable clutch member, a pair of driving clutch members fixed on the countershaft at opposite ends of the shiftable clutch member each having a driving abutment adapted to engage one of the projections on the shiftable clutch member, manually operable means for shifting the shiftable clutch member endwise alternately in opposite directions to withdraw one projection from engagement with its driving abutment and present the other projection in the path of its driving abutment, said two abutments being spaced around the countershaft to permit the driving clutch members to rotate one-half a revolution relatively to the driven member before picking up the driven member when the driven member is shifted endwise in either direction, and resilient latches mounted on the driving clutch members for holding the driving projections against the abutments.

17. In a motion picture projector for exhibiting pictures by the use of films having recurring series of images of different color values, the combination of a filter carrier rotatably mounted on the shutter shaft of the projector and driven therefrom, a series of differently colored light filters on the carrier corresponding in color value with the color values of the several images of each of the series of images on the film, and manually operable means for setting the filter carrier while the projector is in operation to synchronize the filters with the film images.

In testimony whereof I hereunto affix my signature.

FREDERICK T. O'GRADY.